United States Patent [19]

Nagahisa et al.

[11] 3,876,574

[45] Apr. 8, 1975

[54] RUST PREVENTING PAINT CONSISTING ESSENTIALLY OF HIGH MOLECULAR METAL-COMBINING REACTION PRODUCT

[75] Inventors: Masaki Nagahisa; Susumu Nagao, both of Osaka; Morio Kimura, Kanagawa; Kameo Machihara, Hyogo; Syozo Yamamoto, Kanagawa, all of Japan

[73] Assignee: Kansai Paint Co., Ltd., Hyogo, Japan

[22] Filed: Sept. 21, 1972

[21] Appl. No.: 291,042

Related U.S. Application Data

[63] Continuation-in-part of Ser. No. 793,595, Jan. 23, 1969, abandoned, and a continuation-in-part of Ser. No. 178,784, Sept. 8, 1971, abandoned.

[30] Foreign Application Priority Data

Jan. 23, 1968 Japan.................................. 43-3496

[52] U.S. Cl................ 260/22 D; 106/14; 260/22 R; 260/40 R
[51] Int. Cl............................................ C08g 17/16
[58] Field of Search........ 106/14; 252/387; 252/388; 117/132; 260/429, 435, 437, 414, 22 D, 22CA, 22 CB, 22 A

[56] References Cited
UNITED STATES PATENTS

| | | | |
|---|---|---|---|
| 2,715,111 | 8/1955 | Wiinberg........................ | 260/22 CA |
| 3,219,604 | 11/1965 | Fischer........................... | 260/22 CB |
| 3,258,475 | 6/1966 | Faulkne et al. ................ | 260/22 CA |

*Primary Examiner*—Lewis T. Jacobs
*Attorney, Agent, or Firm*—Wenderoth, Lind & Ponack

[57] ABSTRACT

A rust preventing paint for steel which contains high molecular weight metal-combining reaction product as a film-forming material.

8 Claims, No Drawings

RUST PREVENTING PAINT CONSISTING ESSENTIALLY OF HIGH MOLECULAR METAL-COMBINING REACTION PRODUCT

The present application is a continuation-in-part of our corresponding application Ser. No. 793,595, filed Jan. 23, 1969 and application Ser. No. 178,784, filed Sept. 8, 1971, both abandoned.

This invention relates to a rust-preventing paint for steel containing a high molecular weight metal-combined reaction product as a film forming-material.

The object of this invention is to provide a novel rust preventing paint which can be easily applied to the surface of steel. In the case of rust remaining on the surface of the steel to be painted said paint permeates into the layer of rust; and in the cases where no rust exists on the surface of the steel, said paint adheres well thereon. As a result, in either of the above cases, the paint of this application can prevent corrosion of steel in the atmosphere.

For the rusty surface of steel, heretofore, an oleoresinous paint consisting of linseed oil and red lead has been used, but such a paint has been insufficient in its rust preventing effect in polluted air and in its quickness in drying. The rust preventing effect of an anticorrosive paint consisting of synthetic resins (for example, red paint of long oil alkyd resins) is also insufficient because said paint is insufficient in its ability to permeate into underlying rust and as a result, the paint is insufficient for preventing the growth of rust.

As described above, heretofore it has been very difficult to prepare a paint effective against the rusty surface of steel and having the following properties.

1. Good wetting, permeating, and adhering properties.
2. Good weather property and rust preventive effect in polluted air.
3. Good workability and rapid drying property in practice.

It has been discovered that these difficulties are solved by using high molecular weight metal-combined reaction products as film forming materials for rust preventing paints. Said reaction products are produced from reactions between (1) aliphatic polycarboxylic acids, (2) monocarboxylic acids, (3) reactive compounds of metals selected from the group consisting of lead, calcium, cobalt, zinc, iron, manganese, nickel, magnesium, barium, cadmium, strontium and chromium, and (4) polyhydric alcohols.

Heretofore, a polyester resin composition modified with an aliphatic monocarboxylic acid through the agency of metal linkage was well known and is characterized by a remarkable increased viscosity in uncured condition.

On the other hand, the high molecular weight metal-combining reaction products of the present invention has respective metals in their polymer structure and differ from above-mentioned polyester resin in their structure and excellent rust preventing property. Also, the present invention is directed to a rust preventive paint vehicle which forms an adherent film, especially on steel.

A conventional rust preventing paint consists of a binder such as processed drying oil, alkyd resin, and phenol resin as a single component or a suitable mixture of those as the principal film forming material, anticorrosive pigment selected from the group consisting of red lead, lead powder, lead suboxide, zinc dust, basic lead chromate and zinc yellow, and a basic pigment such as zinc oxide and iron oxide powder as an auxiliary pigment. When said paint is applied on the surface of steel, a water impermeable dryed film can be easily formed, and, as a result, the pigment in said film converts anticorrosive substances produced by electrochemical reaction, or the oxidation and aging of film into a passive state, thereby preventing the formation of rust.

While, in the rust preventing paint consisting essentially of high molecular weight metal-combining reaction product of the present invention, the said high molecular weight metal-combining reaction product itself employed as a film forming material has rust preventing action and accordingly, the addition of an anticorrosive pigment is not particularly required. However, a coloring pigment and extender for general use may be added to said film forming material to afford a suitable viscosity and fluidity, whereby the paint can be uniformly and thickly applied on a steel material. The film so applied is reinforced and made to afford favorable durability, and further a desirable coloring can thereby be attained.

The process for the production of the rust preventing paint of this invention comprises the following steps.

1. Into an aliphatic polycarboxylic acid having two carboxyl groups in its molecule, as a single component, or a mixture obtained by adding an equimolar or less of a monocarboxylic acid to the said aliphatic polycarboxylic acid, a 0.2 to 0.7 equivalent based on the total amount of carboxylic groups present in aliphatic polycarboxylic acid or mixture thereof with monocarboxylic aid of a reactive metal compound is added and the mixture is heated to obtain a reaction product having a high acid value. A 0.1 to 0.7 equivalent based on the carboxylic groups present in the reaction product of a polyhydric alcohol is caused to react with the carboxyl groups of said reaction product to increase its molecular weight. Thereby a high molecular weight metal-combining reaction product having carboxyl groups at the terminals of its structure is produced. The thus obtained metal-combined reaction product is dissolved or dispersed and suspended into an organic solvent to produce the dispersion of a high molecular weight metal-combining reaction product.

In the preparing process for the high molecular weight metal-combining product, increased amount of the reactive metal over 0.7 equivalent may be used if desired, but the excess amount usually simply acts as a filler. If the amount of the reactive metal of less than 0.2 equivalent is used, the resultant product has no desirable rust preventive property and acidity. Also, if the amount of the polyhydric alcohol over 0.7 equivalent or less than 0.1 equivalent is used, the reaction product having desirable molecular weight and carboxyl groups at the terminal parts of its structure is unobtainable.

In general, it may be stated that the amount of reactive metal and polyhydric alcohol used usually falls within the previously mentioned range depending upon variables as amount of added aliphatic polycarboxylic acid, acidity desired and molecular weight of the reaction product desired.

2. Next, the above-mentioned dispersion of high molecular weight metal-combined reaction product is independently employed as a vehicle, and a dryer for paint, etc. are added thereto to produce the rust preventing paint of the invention without any pigment.

3. On the other hand, the dispersion of the high molecular weight metal-combined reaction product is separately used or mixed with other paint vehicle; further, a coloring pigment, extender, and additives for paint (that is, auxiliary agents such as dispersing agent, dryer, and anti-skinning agent, hereinafter these agents are refered to simply as "additives") are further added thereto to obtain a mixture, and said mixture is sufficiently kneaded by a dispersing device such as ball mill, and roll mill thereby to produce the rust preventing paint containing the dispersion of this invention. In this case, an anticorrosive pigment may be mixed with said dispersion.

The following components are used for producing the dispersion of the high molecular weight metal-combining reaction product compound of this invention:

1. Aliphatic polycarboxylic acids having two carboxyl groups in its molecule, which may be used, include dimer acids such as tall oil dimer acid, linseed oil dimer acid; maleic acid.

Tall oil dimer acid is obtained from tall oil. Dimer content is from 70 to 95 wt.%, the rest is the mixture of trimer and monomer.

Linseed oil dimer acid is obtained from linseed oil. Dimer content is from 60 to 95 wt.%, the rest is the mixture of trimer and monomer.

2. Monocarboxylic acids which may be used, include $C_{10} - C_{20}$ aliphatic monocarboxylic acids, consisting of a single carboxyl group attached to the end of a straight hydrocarbon chain such as linseed oil fatty acid, soybean oil fatty acid, tall oil fatty acid; rosin acid existing into wood rosin, gum rosin and tall rosin, aromatic monocarboxylic acid such as benzoic acid.

Linseed oil fatty acid is obtained by the saponification of linseed oil. Said fatty acid has the iodine value from 160 to 210. Soybean oil fatty acid is obtained by the saponification of soybean oil. Said fatty acid has the iodine value from 100 to 155. Tall oil fatty acid is obtained by the cracking of tall oil, comprising a fatty acids content in the range of 90 to 98 wt.%. Rosin acid which may be used, is contained into wood rosin, gum rosin and tall rosin, comprising abietic acid as chief component.

3. Reactive metal compounds which may be used, include oxides or hydroxides of metals such as lead, calcium, cobalt, zinc, iron manganese, nickel, magnesium, barium, cadmium, strontium and chromium.

4. Polyhydric alcohols which may be used, include trihydric alcohols having three of average number of functional groups such as glycerine, trimethylolethane and trimethylolpropane; trihydric alcohol containing amino nitrogen in its molecule such as tris-hydroxymethylaminomethane.

Heretofore, it has been commonly known that a rust preventing paint in which an anticorrosive pigment selected from the group consisting of lead pigments such as lead oxide, tri-lead tetroxide, basic lead chromate, and a metal powder (for example, zinc dust) is used, having been principally used for the preventing the formation of rust on the surface of steel and preventing the influence of polluted air, and considerable effects could have been obtained by the use of said paint.

On the other hand, a paint prepared by physically suspending hydroxides or oxides of a reactive metal compound selected from the group consisting of lead, calcium, cobalt, zinc, iron, manganese, nickel, magnesium, barium, cadmium, strontium, chromium, etc., as a single or admixture component, into a processed drying oil or the other film forming material has little rust preventing effect. Even if there are some effects, the efficiency of those is far inferior to the anticorrosive paints produced from said lead pigments, and accordingly, heretofore, these metal oxides have been merely used for an extender or coloring pigment.

On the other hand, the rust preventing paint of this invention and the dispersion of those including various metal compounds other than the above-mentioned lead pigments as a constituent has the following excellent characteristic features.

1. Favorably dilutable with organic solvents or capable of preparing a stable dispersed suspension therewith.

2. Capable of affording a flexible film due to its amorphousness, little change in the physical properties of said film by the lapse of time, and highly weather resistant.

3. Due to the existence of a carboxyl group at the terminal portion of its high molecular weight structure, favorable wettability, permeability, and adhesiveness to the surface of a steel material and the rust remaining thereon, and accordingly, particularly suitable for the rust preventing coating for a rusty surface of steel.

4. Excellent durability because of the coated films being hardly subjected to hydrolysis.

5. Rapid drying. Accordingly, in short period after applying the rust preventing paint of this invention, a synthetic resin type paint can be over-coated, and it shows excellent adhesiveness to the over-coated film.

6. Favorable storage stability.

As a result, if the rust preventing paint of this invention is employed for rust preventive painting of steel materials for construction, the working property of coating becomes easy. Furthermore, in both cases when rust is present or absent on the surface of a steel, and further even if uneven rust is present on said surface, the paint favorably adheres, wets, permeates thereinto, and rapidly dries, whereby the durability of the steel material can be remarkably increased. Moreover, the finishing of coating can be completed in an early stage and this is useful in practice.

In the following disclosure, examples of the rust preventing paint of the present invention consisting essentially of the high molecular weight metal-combined reaction product as a film forming material will be shown.

The examples are for the purpose of illustration only and this invention shall not be limited to the examples.

Example 1

1680 parts by weight (3 moles) of linseed oil dimer (dimer content about 75 wt.%, iodine value 180, neutralization value 200: hereinafter the same) acid and 560 parts by weight (2 moles) of soybean oil fatty acid (iodine value 135, neutralization value 200: hereinafter the same) were placed in a three-necked flask with a stirrer, thermometer, and condenser provided with branched tube and heated for 30 minutes while stirring. When the temperature of the contents in said flask reached 160°C, 74.1 parts (1 mole) by weight of calcium hydroxide was added thereto little by little, and the obtained mixture was made to react for 1 hour while keeping the temperature within the range of 160°

−180°C. Further, 46 parts by weight (0.5 mole) of glycerine was added to the reacted substance, the temperature of which was elevated to 200°C to react them for 3 hours. When the total amount of the distillate water reached 63 parts by weight (theoretical value), the heating was stopped and the reaction product cooled. When the temperature of said product reached about 80°C, xylene was added thereto to produce a high molecular weight metal-combined reaction product I having a concentration of 60% by weight.

In accordance with the formula of the following Table I, into this high molecular metal-combined reaction product I, a coloring pigment and extender were added and kneaded well with a roll or ball mill. A dryer and solvent were added thereto to produce so called "rust preventing paint containing pigment" of the invention which contains iron oxide pigment.

TABLE I

|  | (parts by weight) |
|---|---|
| Red Iron Oxide | 8.0 |
| Heavy Calcium Carbonate | 48.0 |
| Weight metal-combining reaction product I (solid matter 60%) | 39.0 |
| Lead Naphthenate (Pb: 15%) | 0.8 |
| Cobalt Naphthenate (Co: 5%) | 0.2 |
| Mineral Spirit | 4.0 |
| Total: | 100.0 |

Example 2 – Example 11

Following the same procedure as described in Example 1, using instead of calcium hydroxide the hydroxide of various metals shown in Table 2, there were produced various high molecular weight metal-combined reaction products. Furthermore, various rust preventing paints containing pigments of the present invention were produced by replacing the high molecular weight metal-combined reaction product I in the formula of Table I by the high molecular weight metal-combined reaction products shown in Table 2 in the same blending radio, respectively.

TABLE 2

| Example | Reactive Metal Compound | Blending Amount (parts by weight) | Total Amount of Distillate Water (parts) by weight) | High Molecular Metal-combined Reaction Product |
|---|---|---|---|---|
| 2 | Cobalt Hydroxide | 92.9 | 63 | High Molecular Cobalt-combined Reaction Product II |
| 3 | Zinc Hydroxide | 99.4 | 63 | High Molecular Zinc-combined Reaction Product III |
| 4 | Iron Hydroxide | 106.9 | 81 | High Molecular Iron-combined Reaction Product IV |
| 5 | Manganese Hydroxide | 88.9 | 63 | High Molecular Nickel-combined Reaction Product V |
| 6 | Nickel Hydroxide | 92.7 | 63 | High Molecular Nickel-combined Reaction Product VI |
| 7 | Magnesium Hydroxide | 58.3 | 63 | High Molecular Nickel-combined Reaction Product VII |
| 8 | Barium Hydroxide | 171.3 | 63 | High Molecular Barium-combined Reaction Product VIII |
| 9 | Cadmium Hydroxide | 146.4 | 63 | High Molecular Cadmium-combined Reaction Product IX |
| 10 | Strontium Hydroxide | 121.6 | 63 | High Molecular Strontium-combined Reaction Product X |
| 11 | Chromium Hydroxide | 103.0 | 81 | High Molecular Chromium-combined Reaction Product XI |
| 11b | Lead Hydroxide | 241.2 | 63 | High Molecular Lead-combined Reaction Product XIb |

Example 12

630 parts by weight (1.12 moles) of tall oil dimer acid (dimer content about 75 wt.%, acid value 190, saponification value 195: hereinafter the same) was put in a three-necked flask with a stirrer, thermometer and condenser provided with branched tubes, heated for 30 minutes while stirring, and at the time when the temperature of the contents had become to 160°C, 25.2 parts by weight (0.34 mole) of calcium hydroxide was added little by little and allowed to react for 1 hour keeping the temperature at 160° – 180°C. 40 parts by weight (0.33 mole) of trihydroxymethylaminomethane was added keeping the temperature at 180°C, and the mixture allowed to further react for 1 hour. At the time when the total amount of the distillate water has accounted to 27 parts by weight (90% of the theoretical value), heating was stopped and the product allowed to cool. At the time when a temperature of the product had fallen to about 80° C, xylene was added, and dispersion of nitrogen-containing high molecular weight calcium-combined reaction product XII of 60% concentration by weight was obtained.

Into this dispersion of nitrogen-containing high molecular weight calcium-combined reaction product XII, a dryer and solvent were added in accordance with the following formula of Table 3, and the rust preventing paint without pigment of the invention was obtained.
8n

TABLE 3

|  | (parts by weight) |
|---|---|
| Dispersion of Nitrogen-containing High Molecular Calcium-combined Reaction Product XII | 90.0 |
| Lead Naththenate (Pb: 15%) | 0.8 |
| Cobalt Naththenate (Co: 5%) | 0.2 |
| Mineral Spirit | 4.5 |
| xylene | 4.5 |
| Total: | 100.0 |

Example 13 – Example 22

The same procedure as described in Example 12 is followed, substituting the calcium hydroxide by one equivalent mole of respective hydroxide of various metals shown in Table 4. The thus obtained respective nitrogen-containing high molecular weight metal-combined reaction product was substituted for nitrogen-containing high molecular weight calcium-combined reaction product XII in the formula (parts by weight) of the rust preventing paint shown in Table 3, and thus the rust preventing paint without pigment of the invention was obtained.

TABLE 4

| Example | Reactive Metal Compound | Blending Amount (parts by weight) | Total Amount of Distillate Water (parts by weight) | Nitrogen-containing High Molecular Metal-combined Reaction Product |
|---|---|---|---|---|
| 13 | Cobalt Hydroxide | 31.6 | 27.0 | Nitrogen-containing High Molecular Cobalt-combined Reaction Product XIII |
| 14 | Zinc Hydroxide | 33.8 | 33.0 | Nitrogen-containing High Molecular Zinc-combined Reaction Product XIV |
| 15 | Iron Hydroxide | 36.4 | 33.0 | Nitrogen-containing High Molecular Iron-combined Reaction Product XV |
| 16 | Manganese Hydroxide | 30.2 | 27.0 | Nitrogen-containing High Molecular Manganese-combined Reaction Product XVI |
| 17 | Nickel Hydroxide | 31.5 | 27.0 | Nitrogen-containing High Molecular Nickel-combined Reaction Product XVII |
| 18 | Manganesium Hydroxide | 19.8 | 27.0 | Nitrogen-containing High Molecular Mangnesium-combined Reaction Product XVIII |
| 19 | Barium Hydroxide | 58.2 | 27.0 | Nitrogen-containing High Molecular Barium-combined Reaction Product XIX |
| 20 | Cadmium Hydroxide | 49.8 | 27.0 | Nitrogen-containing High Molecular Cadmium-combined Reaction Product XX |
| 21 | Strontium Hydroxide | 41.2 | 27.0 | Nitrogen-containing High Molecular Strontium-combined Reaction Product XXI |
| 22 | Chromium Hydroxide | 35.0 | 33.0 | Nitrogen-containing High Molecular Chromium-combined Reaction Product XXII |
| 22b | Lead Oxide | 76.0 | 21.0 | Nitrogen-containing High Molecular Lead-combined Reaction Product XXIIb |

Example 23

The dispersion of nitrogen-containing high molecular weight calcium-combining reaction product XII of Example 12, was mixed with long oil alkyd resin varnish (oil length 60% by weight, long oil alkyd resin was produced by the modification of polyester, comprising the reaction product of phthalic anhydride and pentaerythritol, with soybean fatty acid; hereinafter the same). There was then added coloring pigment and extender as shown in the formula of the following Table 5. The mixture was kneaded well by roll or ball mill. To the mixture was added a dryer and solvent. The rust preventing paint containing pigment of the invention, which is a mixture of 80% long oil alkyl resin and 20% dispersion of nitrogen-containing high molecular weight calcium-combined reaction product XII, containing iron oxide pigment, was obtained.

TABLE 5

| | (parts) by weight) |
|---|---|
| Red Iron Oxide | 8.0 |
| Calcium Carbonate | 45.0 |
| Aluminum Stearate | 0.5 |
| Dispersion of Nitrogen-containing High Molecular Calcium-combined Reaction Product XII (solid Matter 60%) | 7.0 |
| Long Oil Alkyd resin Varnish (Solid Matter 60%) | 28.0 |
| Lead Naphthenate (Pb: 15%) | 0.8 |
| Cobalt Naphthenate (Co: 5%) | 0.2 |
| Mineral Spirit | 10.5 |
| Total: | 100.0 |

Example 24 – Example 33

Following Example 23, substituting the nitrogen-containing high molecular weight metal-combined reaction product as shown in the following Table 6 for the nitrogen-containing high molecular weight metal-combined reaction product XII in the formula (parts by weight) of Table 5, the rust preventing paint containing pigment of the invention was obtained.

TABLE 6

| Example | Reactive Metal Compound | Nitrogen-containing High Molecular Metal-combined Reaction Product |
|---|---|---|
| 24 | Cobalt Hydroxide | Nitrogen-containing High Molecular Cobalt-combined Reaction Product XIII |
| 25 | Zinc Hydroxide | Nitrogen-containing High Molecular zinc-combined Reaction Product XIV |
| 26 | Iron Hydroxide | Nitrogen-containing High Molecular Iron-combined Reaction Product XV |
| 27 | Manganese Hydroxide | Nitrogen-containing High Molecular Manganese-combined Reaction Product XVI |
| 28 | Nickel Hydroxide | Nitrogen-containing High Molecular Nickel-combined Reaction Product XVII |
| 29 | Magnesium Hydroxide | Nitrogen-containing High Molecular Magnesium-combined Reaction Product XVIII |
| 30 | Barium Hydroxide | Nitrogen-containing High Molecular Barium-combined Reaction Product XIX |
| 31 | Cadmium Hydroxide | Nitrogen-containing High Molecular Cadmium-combined Reaction Product XX |
| 32 | Strontium Hydroxide | Nitrogen-containing High Molecular Strontium-combined Reaction Product XXI |
| 33 | Chromium Hydroxide | Nitrogen-containing High Molecular Chromium combined Reaction Product XXII |
| 33b | Lead Oxide | Nitrogen-containing High Molecular Lead-combined Reaction Product XXIIb |

Example 34

336 parts by weight (0.6 mole) of tall oil dimer acid and 112 parts by weight (0.4 mole) of linseed oil fatty acid (iodine value 180, neutralization value 200: hereinafter the same) are put in a three-necked flask with a stirrer thermometer and condenser with branched tube and heated for 30 minutes while stirring. At the time when the temperature of the contents reaches 160°C, 37.1 parts by weight (0.5 mole) of calcium hydroxide is added little by little and the mixture allowed to react for 1 hour keeping the temperature at 160° - 180°C. There is added 16.2 parts by weight (0.12 mole) of trimethylolpropane, the temperature is raised to 200°C and the mixture allowed to react for 3 hours. At the same time when the total amount of the distillate water has accounted to 24.5 parts by weight (theoretical value), heating is topped and the mixture allowed to cool and at the time when the temperature of the reacted product has fallen to about 80°C, xylene is added so that the concentration of the product is diluted to 60% by weight. Thus high molecular weight calcium-combined reation product XXIII was obtained.

Using this high molecular weight calcium-combined reaction product XXIII and following Example 1 according to the formula (parts by weight) as shown in the following Table 7, the rust preventing paint containing pigment of the invention was obtained.

TABLE 7

|  | (parts by weight) |
| --- | --- |
| Red Iron Oxide | 8.0 |
| Heavy Calcium Carbonate | 48.0 |
| High Molecular Calcium-combined Reaction Product XXIII (Solid Matter 60%) | 39.0 |
| Lead Naphthenate (Pb: 15%) | 0.8 |
| Cobalt Naphthenate (Co: 5%) | 0.2 |
| Mineral Spirit | 4.0 |
| Total: | 100.0 |

Example 35 – Example 44

Following Example 34, substituting the calcium hydroxide by respective hydroxide of various metals as shown in the following Table 8 and allowing the mixture to react, there is produced respective high molecular weight metal-combined reaction product. These are substituted for the high molecular weight calcium-combined reaction product XXIII in the formula of the rust preventing paint shown in Table 7, and thus the rust preventing paint containing pigment of the invention was obtained.

TABLE 8

| Example | Reactive Metal Compound | Blending Amount (parts by weight) | Total Amount of Distillate Water (parts by weight) | High Molecular Metal-combined Reaction Product |
| --- | --- | --- | --- | --- |
| 35 | Cobalt Hydroxide | 46.5 | 24.5 | High Molecular Cobalt-combined Reaction Product XXIV |
| 36 | Zinc Hydroxide | 49.7 | 24.5 | High Molecular Zinc-combined Reaction Product XXV |
| 37 | Iron Hydroxide | 53.4 | 33.5 | High Molecular Iron-combined Reaction Product XXVI |
| 38 | Manganese Hydroxide | 44.5 | 24.5 | High Molecular Manganese-combined Reaction Product XXVII |
| 39 | Nickel Hydroxide | 46.4 | 24.5 | High Molecular Nickel-combined Reaction Product XXVIII |

TABLE 8-Continued

| Example | Reactive Metal Compound | Blending Amount (parts by weight) | Total Amount of Distillate Water (parts by weight) | High Molecular Metal-combined Reaction Product |
| --- | --- | --- | --- | --- |
| 40 | Magnesium Hydroxide | 29.2 | 24.5 | High Molecular Magnesium-combined Reaction Product XXIX |
| 41 | Barium Hydroxide | 85.7 | 24.5 | High Molecular Barium-combined Reaction Product XXX |
| 42 | Cadmium Hydroxide | 73.2 | 24.5 | High Molecular Cadmium-combined Reaction Product XXXI |
| 43 | Strontium Hydroxide | 60.8 | 24.5 | High Molecular strontium-combined Reaction Product XXXII |
| 44 | Chromium Hydroxide | 51.5 | 33.5 | High Molecular Chromium-combined Reaction Product XXXIII |
| 44b | Lead Oxide | 111.6 | 15.5 | High Molecular Lead-combined Reaction Product XXXIIIb |

Example 45

98 parts by weight (1 mole) of maleic acid anhydride and 280 parts by weight (1 mole) of linseed oil fatty acid were put in a three-necked flask with a stirrer, thermometer and condenser provided with branched tube and the mixture heated to raise the temperature up to 200°C in about 30 minutes. The mixture is allowed to react for about 5 hours. After the temperature of the contents has fallen to 160°C there are added 37.1 parts by weight (0.5 mole) of calcium hydroxide little by little and the mixture allowed to react for about 1 hour at the temperature 160° - 180°C, while stirring. There is then added 32 parts by weight (0.27 mole) of trimethylolethane little by little, keeping the temperature of the content at 180°C and the mixture is allowed to react 1 hour. At the time when the total amount of the distillate water has accounted to 32.5 parts by weight, heating is stopped and the mixture allowed to cool. At the time when the temperature of the contents has fallen to 80°C, xylene is added and thus high molecular weight calcium-combined reaction product XXXIV of 60% concentration by weight was obtained.

Using this high molecular weight calcium-combined reaction product XXXIV, according to Example 1, after the formula (parts by weight) shown in the following Table 9, the rust preventing paint containing pigment of the invention, which contains iron oxide pigment, was obtained.

TABLE 9

|  | (parts by weight) |
| --- | --- |
| Iron Oxide | 9.0 |
| Heavy Calcium Carbonate | 48.0 |
| High Molecular calcium-combined Reaction Product XXXIV (Solid Matter 60%) | 39.0 |
| Lead Naphthenate (Ph: 15%) | 0.8 |
| Mineral Spirit | 3.0 |
| Total | 100.0 |

Example 46 – Example 55

Following Example 45, substituting calcium hydroxide by 0.5 mole of respective hydroxide of various metals as shown in the following Table 10, there are produced respective high molecular weight metal-combining reaction product. These are substituted for high molecular weight calcium-combined reaction product XXXIV in the formula (parts by weight) of the rust preventing paint containing pigment shown in Table 9 of Example 45, and thus the rust preventing paint containing pigment of the invention is obtained.

TABLE 10

| Example | Reactive Metal Compound | Blending Amount (parts by weight) | Total Amount of Distillate Water (parts by weight) | High Molecular Metal-combined Reaction Product |
|---|---|---|---|---|
| 46 | Cobalt Hydroxide | 46.5 | 32.5 | High Molecular Cobalt-combined Reaction Product XXXV |
| 47 | Zinc Hydroxide | 49.7 | 32.5 | High Molecular Zinc-combined Reaction Product XXXVI |
| 48 | Iron Hydroxide | 53.4 | 41.5 | High Molecular Iron-combined Reaction Product XXXVII |
| 49 | Manganese Hydroxide | 44.5 | 32.5 | High Molecular Manganese combined Reaction Product XXXVIII |
| 50 | Nickel Hydroxide | 46.4 | 32.5 | High Molecular Nickel-combined Reaction Product XXXIX |
| 51 | Magnesium Hydroxide | 29.2 | 32.5 | High Molecular Magnesium-combined Reaction Product XL |
| 53 | Cadmium Hydroxide | 73.2 | 32.5 | High Molecular Cadmium-combined Reaction Product XLII |
| 54 | Strontium Hydroxide | 60.8 | 32.5 | High Molecular Strontium-combined Reaction Product XLIII |
| 55 | Chromium Hydroxide | 51.5 | 41.5 | High Molecular Chromium-combined Reaction Product XLIV |
| 55b | Lead Oxide | 111.6 | 13.0 | High Molecular Lead-combined Reaction Product XLIVb |

Example 56

560 parts by weight (1 mole) of tall oil dimer acid and 302 parts by weight (1 mole) of gum rosin acid (Softening point 78°C, acid value 180, hereinafter the same) were put in a three-necked flask with a stirrer, thermometer and condenser provided with branched tube and heated for about 30 minutes. At the time when the temperature of the contents becomes 160°C 34.1 parts by weight (0.46 mole) of calcium hydroxide were added little by little while stirring and the mixture allowed to react for about 1 hour keeping the temperature at 160° – 180°C There was added 53 parts by weight (0.44 mole) of trishydroxymethylaminomethane and keeping the temperature at 180°C, the mixture allowed to react for 1 hour. At the time when the total amount of the distillate water has accounted to 36 parts by weight (90% of the theoretical value), heating was stopped and the mixture allowed to cool. At the time when the temperature of the product has fallen to 80°C, xylene was added, and thus nitrogen-containing high molecular weight calcium-combined reaction product XLV of 60% concentration by weight was obtained.

This nitrogen-containing high molecular weight calcium-combined reaction product XLV was added with a drier and solvent as in the formula of the following Table 11, and thus the rust preventing paint without pigment of the invention was obtained.

TABLE 11

| | (parts by weight) |
|---|---|
| Oily Dispersoid Nitrogen-containing High Molecular Calcium-combined Reaction Product XLV (Solic Matter 60%) | 90.0 |
| Lead Naphthenate (Pb: 15%) | 0.8 |
| Cobalt Naphthenate (CO: 5%) | 0.2 |
| Xylene | 9.0 |
| Total: | 100.0 |

Example 57 – Example 66

Following Example 56, substituting calcium hydroxide by 0.46 mole of respective hydroxide of various metals shown in the following Table 12, there was produced respective nitrogen-containing high molecular weight metal-combined reaction product. These were substituted for nitrogen-containing high molecular weight calcium-combined reaction product XLV in the formula (parts by weight) of the rust preventing paint without pigment shown in Table 11 of Example 56, and thus the rust preventing paint without pigment of the invention was obtained. 8n

TABLE 12

| Example | Reactive Metal Compound | Blending Amount (parts by weight) | Total Amount of Distillate Water (parts by weight) | High Molecular Metal-combined Reaction Product |
|---|---|---|---|---|
| 57 | Cobalt Hydroxide | 42.8 | 36 | High Molecular Cobalt-combined Reaction Product XLVI |
| 58 | Zinc Hydroxide | 44.7 | 36 | High Molecular Zinc-combined Reaction Product XLVII |
| 59 | Iron Hydroxide | 49.2 | 44 | High Molecular Iron-combined Reaction Product XLVIII |
| 60 | Manganese Hydroxide | 40.0 | 36 | High Molecular Manganese-combined Reaction Product XLIX |
| 61 | Nickel Hydroxide | 42.8 | 36 | High Molecular Nickel-combined Reaction Product L |

TABLE 12-Continued

| Example | Reactive Metal Compound | Blending Amount (parts by weight) | Total Amount of Distillate Water (parts by weight) | High Molecular Metal-combined Reaction Product |
|---|---|---|---|---|
| 62 | Magnesium Hydroxide | 26.8 | 36 | High Molecular Magnesium-combined Reaction Product LI |
| 63 | Barium Hydroxide | 78.7 | 36 | High Molecular Barium-combined Reaction Product LII |
| 64 | Cadmium Hydroxide | 67.4 | 36 | High Molecular Cadmium-combined Reaction Product LIII |
| 65 | Strontium Hydroxide | 55.7 | 36 | High Molecular Strontium-combined Reaction Product LIV |
| 66 | Chromium Hydroxide | 47.4 | 44 | High Molecular Chromium-combined Reaction Product LV |
| 66b | Lead Oxide | 102 | 28 | Nitrogen-containing High Molecular Lead-combined Reaction Product LVb |

Example 67

630 parts by weight (1.12 moles) of tall oil dimer acid were placed in a three-necked flask with a stirrer, thermometer and condenser provided with branched tube and heated for 30 minutes while stirring. At the time when the temperature of the contents become 160°C, 19.1 parts by weight (0.34 mole) of calcium oxide was added little by little and the mixture allowed to react for 1 hour while keeping the temperature at 160° – 180°C. There were then added 40 parts by weight (0.33 mole) of trishydroxymethyl-aminomethane, the temperature kept at 180°C, and the mixture allowed to further react for 1 hour. At the time when the total amount of the distillate water has accounted to 21.5 parts by weight (90% of the theoretical value), heating was stopped and the product allowed to cool. At the time when the temperature of the reaction product had fallen to about 80°C, xylene was added, and thus the nitrogen-containing high molecular weight calcium-combined reaction product LVI of 60% concentration by weight was obtained.

This nitrogen-containing high molecular weight calcium-combined reaction product LVI was mixed with long oil alkyd resin varnish (oil length 60%, modified with soybean oil), and added with coloring pigment and extender shown in the formula (parts by weight) of the following Table 13 and kneaded well by roll or ball mill. There were added a dryer and solvent, and thus the rust preventing paint containing pigment of the invention which was a mixture of 80% by weight long oil alkyd resin varnish and 20% by weight nitrogen-containing high molecular weight calcium-combined reaction product LVI containing iron oxide pigment, was obtained.

TABLE 13

| | (parts by weight) |
|---|---|
| Red Iron Oxide | 8.0 |
| Calcium Carbonate | 45.0 |
| Aluminum Stearate | 0.5 |
| Nitrogen-containing High Molecular calcium-combined Reaction Product (Solid Matter 60%) | 7.0 |
| Long Oil Alkyd Resin Varnish (Solid Matter 60%) (oil length 60%, modified with soybean oil) | 28.0 |
| Lead Naphthenate (Pb: 15%) | 0.8 |
| Cobalt Naphthenate (Co: 5%) | 0.2 |
| Mineral Spirit | 10.5 |
| Total: | 100.0 |

Example 68 – Example 73

Following Example 67, substituting calcium oxide by respective oxide of various metals shown in the following Table 14, there were produced respective nitrogen-containing high molecular weight metal-combined reaction product. These were substituted at the same ratio for the nitrogen-containing high molecular weight calcium-combined reaction product LVI in the formula of the rust preventing paint shown in Table 13 of Example 67, and thus the rust preventing paint containing pigment of the invention were obtained.

TABLE 14

| Example | Reactive Metal Compound | Blending Amount (parts by weight) | Total Amount of distillate water (parts by weight) | Nitrogen-containing High Molecular Metal-combined Reaction Product |
|---|---|---|---|---|
| 68 | Cobalt Oxide | 25.5 | 21.5 | Nitrogen-containing High Molecular Cobalt-combined Reaction Product LVII |
| 69 | Zinc Oxide | 27.6 | 21.5 | Nitrogen-containing High Molecular zinc-combined Reaction Product OVIII |
| 70 | Manganese Oxide | 53.8 | 26.5 | Nitrogen-containing High Molecular Manganese-combined Reaction Product LIX |
| 71 | Magnesium Oxide | 13.7 | 21.5 | Nitrogen-containing High Molecular Magnesium-combined Reaction Product LX |
| 72 | Barium Oxide | 52.0 | 21.5 | Nitrogen-containing High Molecular barium-combined Reaction Product LXI |
| 73 | Strontium Oxide | 31.4 | 21.5 | Nitrogen-containing High Molecular Strontium-combined Reaction Product LXII |

The following test examples are set forth in order to provide a comparison between the compositions of the present invention and certain reference formulations. In the following Reference formulas, those which are prescribed in Japanese Industrial Standard (JIS) are indicated.

REFERENCE 1

Oily Red Lead Rust Preventing Paint
(JIS K 5622-1 Red Lead Rust Preventing Paint)

TABLE 15

| | (parts by weight) |
|---|---|
| Red Lead ($Pb_3O_4$ 98%) | 79.0 |
| Zinc Oxide | 1.0 |
| Aluminum Stearate | 0.5 |
| Processed Drying Oil | 18.0 |
| Manganese Naphtenate (Mn: 5%) | 0.2 |
| Mineral Spirit | 1.3 |
| Total: | 100.0 |

REFERENCE 2

Oily Iron Oxide Rust Preventing Paint
(JIS K 5621-1 Rust Preventing Paint for General Use)

TABLE 16

| | (parts by weight) |
|---|---|
| Red Iron Oxide | 8.0 |
| Zinc Oxide | 8.0 |
| Calcium Carbonate | 47.0 |
| Aluminum Stearate | 0.5 |
| Processed Drying Oil | 30.0 |
| Lead Naphthenate (Pb: 15%) | 0.8 |
| Manganese Naphtenate (Mn: 5%) | 0.2 |
| Mineral Spirit | 5.5 |
| Total: | 100.0 |

REFERENCE 3

Long Oil Alkyd Resin Red Lead Rust Preventing Paint
(JIS K 5622-2 Red Lead Rust Preventing Paint)

TABLE 17

| | (parts by weight) |
|---|---|
| Red Lead ($Pb_3O_4$ 98%) | 64.0 |
| Zinc Oxide | 2.0 |
| Aluminum Stearate | 0.5 |
| Long Oil Alkyd Resin Varnish (Solid Matter 60%) (Oil length 60%, modified with soybean oil) | 24.0 |
| Lead Naphthenate (Pb: 15%) | 0.8 |

TABLE 17—Continued

| | (parts by weight) |
|---|---|
| Cobalt Naphthenate (Co: 5%) | 0.2 |
| Mineral Spirit | 8.5 |
| Total: | 100.0 |

REFERENCE 4

Long Oil Alkyd Resin Clear Paint

TABLE 18

| | (parts by weight) |
|---|---|
| Long Oil Alkyd Resin Varnish (solid matter 60%) (oil length 60%, modified with soybean oil) | 90.0 |
| Lead Naphthenate (Pb: 15%) | 0.8 |
| Cobalt Naphthenate (Co: 5%) | 0.2 |
| Mineral Spirit | 9.0 |
| Total: | 100.0 |

Some test results of the Examples in comparison with the References are shown as follows:

Test plate 1 is a steel plate upon which rust remains

Test plate 2 is a steel plate from which the rust has been completely removed by sufficient sandblasting.

Test plate 3 is a non-rusted polished mild steel plate sufficiently cleaned by polishing.

The plates were coated twice at an interval of 24 hours so as to be of uniform thickness by brushing with the above mentioned rust preventing paints. The coated plates were thereafter allowed to stand in a room for 7 days, exposed at atmospheric exposure, for 6 months as to the rust preventing paint without pigment, and for 8 months as to the rust preventing paint containing pigment, and then investigated.

The test results of the investigation were shown in the following Test Example 1 – 3.

TEST EXAMPLE 1

Rust preventing paint without pigment, nitrogen-containing high molecular weight metal-combined reaction product, used alone.

TABLE 19-1

| Test item | No. of Test Piece | | Example |||||||||||||
|---|---|---|---|---|---|---|---|---|---|---|---|---|---|---|
| | | | 12 | 13 | 14 | 15 | 16 | 17 | 18 | 19 | 20 | 21 | 22 | 56 | 22b |
| Atmospheric exposure, coated twice (6 months) | Test plate 3 | Rust preventing effect | ◎ | ◎ | ◎ | ◎ | ◎ | ◎ | ◎ | ◎ | ◎ | ◎ | ◎ | ◎ | ◎ |
| | | Square cut Cello-tape test | ◎ | ◎ | ◎ | ◎ | ◎ | ◎ | ◎ | ◎ | ◎ | ◎ | ◎ | ◎ | ◎ |

TABLE 19-2

| Test item | No. of Test Piece | | Example |||||||||||| Ref. |
|---|---|---|---|---|---|---|---|---|---|---|---|---|---|---|
| | | | 57 | 58 | 59 | 60 | 61 | 62 | 63 | 64 | 65 | 66 | 66b | 4 |
| Atmospheric exposure, coated twice (6 months) | Test plate 3 | Rust preventing effect | ◎ | ◎ | ◎ | ◎ | ◎ | ◎ | ◎ | ◎ | ◎ | ◎ | ◎ | △ |
| | | Square cut Cello-tape test | ◎ | ◎ | ◎ | ◎ | ◎ | ◎ | ◎ | ◎ | ◎ | ◎ | ◎ | ◎ |

TEST EXAMPLE 2

Rust preventing Paint containing pigment, high molecular weight metal-combining reaction product alone as vehicle.

TEST EXAMPLE 3

Rust preventing paint containg pigment in which a vehicle prepared by admixing long oil alkyd resin varnish with nitrogen-containing weight metal-combined reaction product is used.

TABLE 20-1

| Test item | No. of Test piece | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 34 | 11b |
| Atmospheric exposure, coated twice (6 months) | Test plate 1 | Appearance (rust, scab) | ◎ | ◎ | ◎ | ◎ | ◎ | ◎ | ◎ | ◎ | ◎ | ◎ | ◎ | ◎ | ◎ |
| | Test plate 2 | Appearance (rust, scab) | ◎ | ◎ | ◎ | ◎ | ◎ | ◎ | ◎ | ◎ | ◎ | ◎ | ◎ | ◎ | ◎ |
| | | Square cut Cello-tape test | ◎ | ◎ | ◎ | ◎ | ◎ | ◎ | ◎ | ◎ | ◎ | ◎ | ◎ | ◎ | ◎ |

TABLE 20-2

| Test item | No. of Test piece | | Example | | | | | | | | | | | | |
|---|---|---|---|---|---|---|---|---|---|---|---|---|---|---|---|
| | | | 35 | 36 | 37 | 38 | 39 | 40 | 41 | 42 | 43 | 44 | 45 | 46 | 46b |
| Atmospheric exposure, coated twice (6 months) | Test plate 1 | Appearance (rust, scab) | ◎ | ◎ | ◎ | ◎ | ◎ | ◎ | ◎ | ◎ | ◎ | ◎ | ◎ | ◎ | ◎ |
| | Test plate 2 | Appearance (rust, scab) | ◎ | ◎ | ◎ | ◎ | ◎ | ◎ | ◎ | ◎ | ◎ | ◎ | ◎ | ◎ | ◎ |
| | | Square cut Cello-tape test | ◎ | ◎ | ◎ | ◎ | ◎ | ◎ | ◎ | ◎ | ◎ | ◎ | ◎ | ◎ | ◎ |

TABLE 20-3

| Test item | No. of Test piece | | Example | | | | | | | | | | Reference | | |
|---|---|---|---|---|---|---|---|---|---|---|---|---|---|---|---|
| | | | 47 | 48 | 49 | 50 | 51 | 52 | 53 | 54 | 55 | 55b | 1 | 2 | 3 |
| Atmospheric exposure, coated twice (8 months) | Test plate 1 | Appearance (rust, scab) | ◎ | ◎ | ◎ | ◎ | ◎ | ◎ | ◎ | ◎ | ◎ | ◎ | △ | △ | × |
| | Test plate 2 | Appearance (rust, scab) | ◎ | ◎ | ◎ | ◎ | ◎ | ◎ | ◎ | ◎ | ◎ | ◎ | ○ | ○ | ○ |
| | | Square cut Cello-tape test | ◎ | ◎ | ◎ | ◎ | ◎ | ◎ | ◎ | ◎ | ◎ | ◎ | △ | △ | △ |

TABLE 21-1

| Test item | No. of Test piece | | Example | | | | | | | | | | | |
|---|---|---|---|---|---|---|---|---|---|---|---|---|---|---|
| | | | 23 | 24 | 25 | 26 | 27 | 28 | 29 | 30 | 31 | 32 | 33 | 67 | 33b |
| Atmospheric exposure, coated twice (8 months) | Test plate 2 | Rust preventing effect | ◎ | ◎ | ◎ | ◎ | ◎ | ◎ | ◎ | ◎ | ◎ | ◎ | ◎ | ◎ | ◎ |
| | | Square cut Cello-tape test | ◎ | ◎ | ◎ | ◎ | ◎ | ◎ | ◎ | ◎ | ◎ | ◎ | ◎ | ◎ | ◎ |

TABLE 21-2

| Test item | No. of Test piece | | Example | | | | | | Reference |
|---|---|---|---|---|---|---|---|---|---|
| | | | 68 | 69 | 70 | 71 | 72 | 73 | 3 |
| Atmospheric exposure, coated twice (8 months) | Test plate 1 | Rust preventing effect | ◎ | ◎ | ◎ | ◎ | ◎ | ◎ | × |
| | | Square cut Cello-tape test | ◎ | ◎ | ◎ | ◎ | ◎ | ◎ | △ |

(Note) Notations in the above Tables have the following meanings

◎ : excellent

○ : good

⊙ : fair

△ : somewhat bad

× : bad

"Cello-tape" is a trade mark of pressure sensitive adhesive tape.

It is clear from the results of Test Examples 1 – 3, that the rust resisting paint of the invention which is composed of the film forming material containing high molecular weight metal-combining reaction product that has a carboxyl group at the terminal part of its structure, has good wetting properties and permeates to the rusty surface of a steel. Furthermore, the rust preventing paint of this invention has good adhesion to the surface of a steel, the rust on which was previously removed sufficiently and a film of which, after coating, has excellent characteristic features such that so coated steel surface can be maintained in a state free from corrosive substances in polluted air.

The foregoing description contains a limited number of embodiments of the present invention. It will be understood, however, that such embodiments are only illustrative and that numerous variations are possible without departing from the purview of this invention as defined in the following claims.

In the foregoing description and in the following claims, the terms "high molecular metal-combining" and high molecular weight metal-combining and like terms are used interchangeably.

What is claimed is:

1. A rust preventive paint comprising as a film forming material the reaction product of:
   a. the reaction product of:
      1. an aliphatic polycarboxylic acid having two carboxyl groups in its molecule selected from the group consisting of tall oil dimer acid, linseed oil dimer acid and maleic acid or mixture thereof with a monocarboxylic acid selected from the group consisting of linseed oil fatty acid, soybean oil fatty acid, tall oil fatty acid, rosin acid and benzoic acid, and
      2. a 0.2 to 0.7 equivalent based on the total amount of carboxylic groups present in 1) of an oxide or hydroxide of a metal selected from the group consisting of lead, calcium, cobalt, zinc, iron, manganese, nickel, magnesium, barium, cadmium, strontium and chromium and
   b. a 0.1 to 0.7 equivalent based on the carboxylic groups present in reaction product a) of a trihydric aliphatic alcohol or trihydric aliphatic alcohol containing an amino nitrogen selected from the group consisting of glycerine, trimethylolethane, trimethylolpropane and trimethylolaminoethane.

2. The rust preventive paint of claim 1 wherein the monocarboxylic acid is employed in an equimolar or less amount against the aliphatic polycarboxylic acid.

3. The rust preventive paint of claim 2 wherein 3 moles of linseed oil dimer acid as the aliphatic polycarboxylic acid 2 moles of soybean oil fatty acid as the monocarboxylic acid, 1 mole of metal oxide or hydroxide and 0.5 moles of glycerine as the trihydric alcohol are employed.

4. The rust preventive paint of claim 2 wherein 1.12 moles of tall oil dimer acid as the aliphatic polycarboxylic acid, 0.34 moles of metal oxide or hydroxide and 0.33 moles of trimethylolaminomethane are employed.

5. The rust preventive paint according to claim 2 wherein 0.6 moles of tall oil dimer acid as the aliphatic polycarboxylic acid, 0.4 moles of linseed oil fatty acid as the monocarboxylic acid, 0.5 moles of metal oxide or hydroxide and 0.12 moles of trimethylolpropane as the trihydric alcohol are employed.

6. The rust preventive paint according to claim 2 wherein 1 mole of maleic acid anhydride as the aliphatic polycarboxylic acid, 1 mole of linseed oil fatty acid as the monocarboxylic acid, 0.5 moles of metal oxide or oxide or hydroxide and 0.27 moles trihydric alcohol are employed.

7. The rust preventive paint according to claim 2 wherein 1 mole of tall oil dimer as the aliphatic polycarboxylic acid, 1 mole of rosin acid as the monocarboxylic acid, 0.46 moles of metal oxide or hydroxide acid, 0.44 moles of trihydroxymethylaminomethane are employed.

8. The rust preventive paint according to claim 2 wherein 1.12 moles of tall oil dimer acid as the aliphatic polycarboxylic acid, 0.34 moles metal oxide or hydroxide and 0.33 moles trihydroxymethylaminomethane are employed.

* * * * *